(12) United States Patent
Tsuji et al.

(10) Patent No.: US 8,184,645 B2
(45) Date of Patent: May 22, 2012

(54) COMMUNICATION SYSTEM, GATEWAY DEVICE AND ADAPTER DEVICE

(75) Inventors: Kiyotaka Tsuji, Tokyo (JP); Muneyuki Suzuki, Inagi (JP); Masashi Ishida, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1082 days.

(21) Appl. No.: 12/020,624

(22) Filed: Jan. 28, 2008

(65) Prior Publication Data

US 2008/0192919 A1 Aug. 14, 2008

(30) Foreign Application Priority Data

Feb. 14, 2007 (JP) ................................. 2007-033859

(51) Int. Cl.
*H04L 12/56* (2006.01)
(52) U.S. Cl. ........................ 370/401; 370/352
(58) Field of Classification Search .................. 370/401, 370/466, 467, 469, 352
See application file for complete search history.

(56) References Cited

U.S. PATENT DOCUMENTS

| | | | |
|---|---|---|---|
| 2001/0046215 A1 | 11/2001 | Kim | |
| 2006/0114885 A1* | 6/2006 | Baek et al. | 370/352 |
| 2007/0019631 A1* | 1/2007 | Jang | 370/352 |
| 2007/0065078 A1* | 3/2007 | Jiang | 385/76 |
| 2007/0280213 A1* | 12/2007 | Sindhwani et al. | 370/356 |
| 2008/0013957 A1* | 1/2008 | Akers et al. | 398/115 |
| 2008/0159303 A1* | 7/2008 | Deng et al. | 370/401 |

FOREIGN PATENT DOCUMENTS

| | | |
|---|---|---|
| CN | 1325227 A | 12/2001 |
| GB | 2 428 942 A | 2/2007 |
| JP | 2002-290480 | 10/2002 |
| JP | 2003-78572 | 3/2003 |
| JP | 2003-299157 | 10/2003 |
| JP | 2004-222009 | 8/2004 |

* cited by examiner

*Primary Examiner* — Brian Nguyen
(74) *Attorney, Agent, or Firm* — Oblon, Spivak, McClelland, Maier & Neustadt, L.L.P.

(57) ABSTRACT

A gateway device which mutually converts communication protocols among a subscriber network including a base station wirelessly housing a mobile terminal and an Internet Protocol processor to bring an interface from the base station into an Internet Protocol process, a public switched telephone network and a packet communication network, includes a synchronized network terminating unit which terminates the public switched telephone network to generate the in-device signal, a packet network terminating unit which terminates the packet communication network to generate the in-device signal, a subscriber network terminating unit which houses the base station via the interface to which the Internet Protocol process is applied and terminates the subscriber network to generate the in-device signal, and an exchange unit which exchanges in-device signals each generated from the synchronized network terminating unit, the packet network terminating unit and the subscriber network terminating unit.

9 Claims, 4 Drawing Sheets

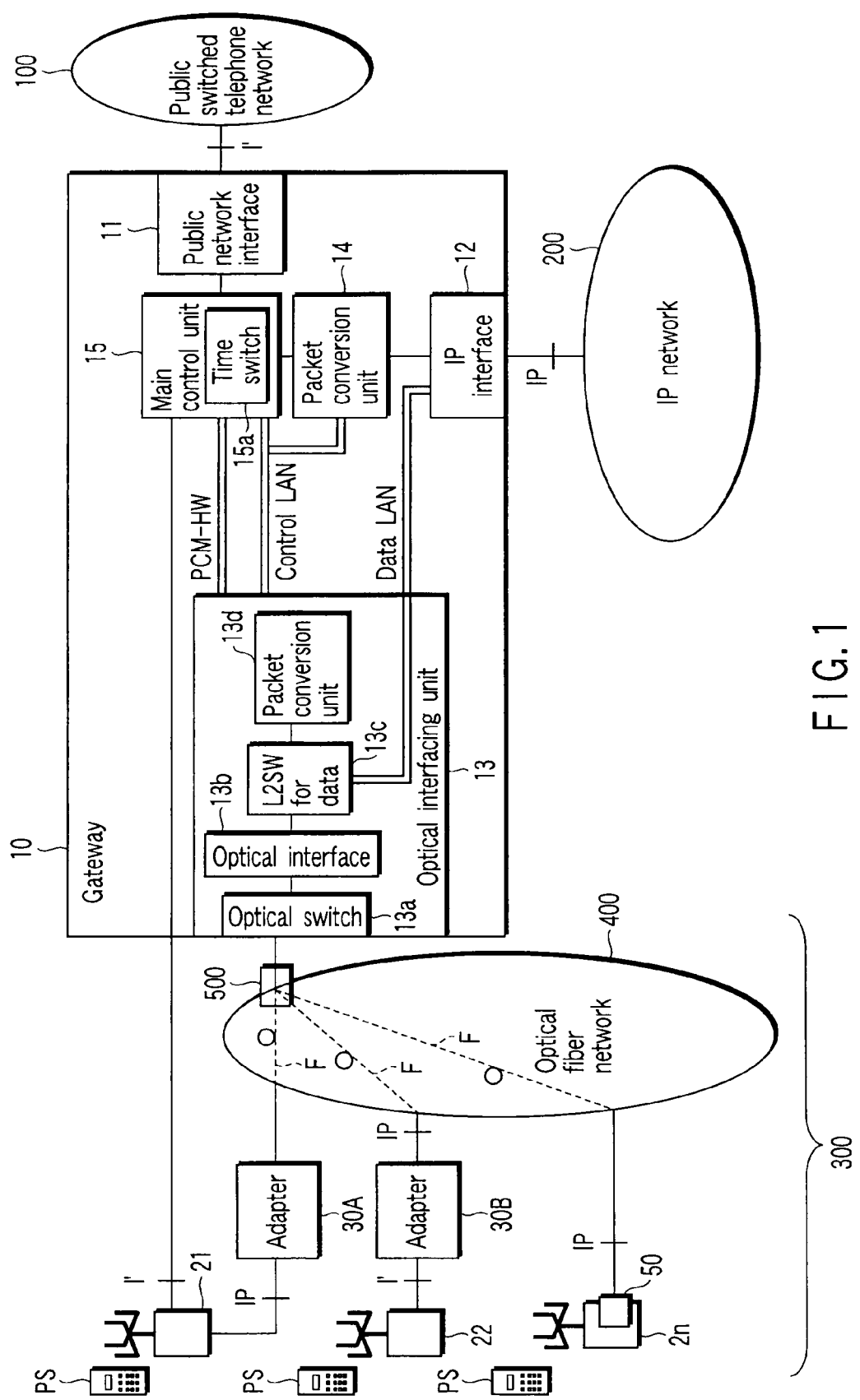
F I G. 1

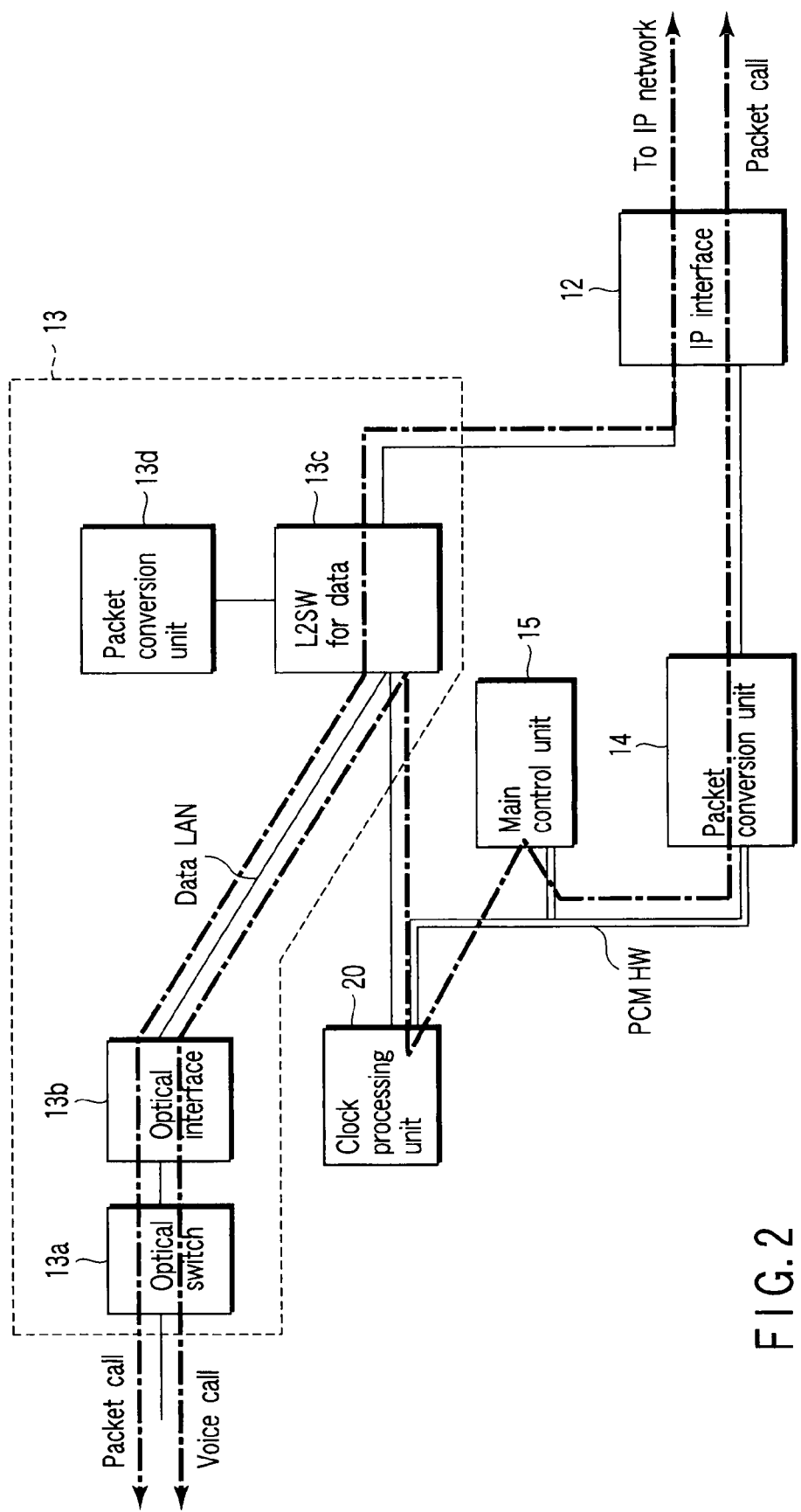
F I G. 2

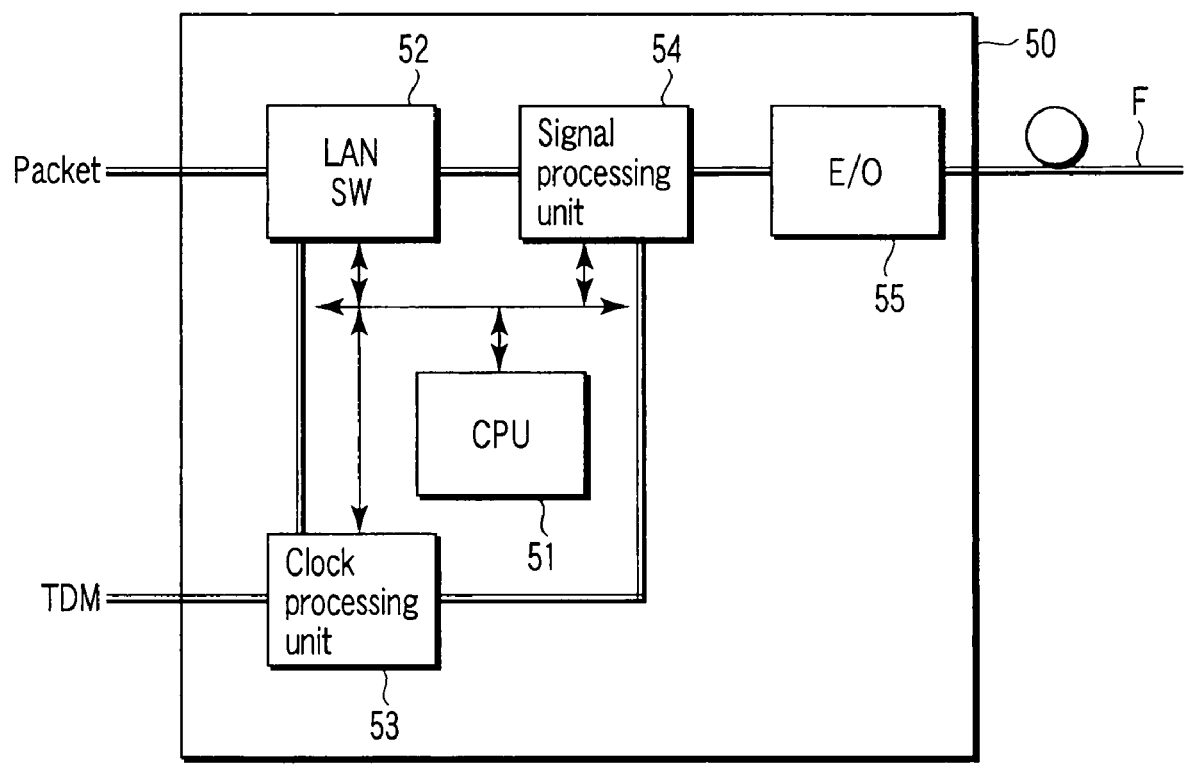
F I G. 4

COMMUNICATION SYSTEM, GATEWAY DEVICE AND ADAPTER DEVICE

CROSS-REFERENCE TO RELATED APPLICATIONS

This application is based upon and claims the benefit of priority from prior Japanese Patent Application No. 2007-033859, filed Feb. 14, 2007, the entire contents of which are incorporated herein by reference.

BACKGROUND OF THE INVENTION

1. Field of the Invention

The present invention relates to a gateway device which mutually connects, for example, between a public switched telephone network and an Internet Protocol (IP) network, and a communication system provided with this kind of device.

2. Description of the Related Art

As needs for information communication become high and liberalization of communication advances, information communication services including voice and data communication have diversified. In accordance with such a background, the number of carriers who newly enter a communication service field has increased, and service competition among the carriers has become serious. The new carriers are called new common carriers (NCCs), and provide a variety of services by using techniques such as voice over Internet Protocol (VoIP), etc. VoIP is a technique which integrates a voice system network and a data system network by packetizing to transmit digital voice data.

The NCCs often lease facilities such as exchanges from a specific carrier which owns subscriber lines at predetermined charges. For the most part of the NCCs construct their own networks such as IP networks by their own funds. In addition to these networks, by adding a public switched telephone network (PSTN) of a specific carrier, a communication system is formed. To provide services to subscribers (users), these facilities are utilized in an interdisciplinary manner.

For mutually connecting different communication networks like the PSTN and the IP network, a gateway device is utilized. This kind of device includes an IP conversion unit to convert voice data and binary data into IP packets, and a packet switching unit which switches the IP packets. All of these units act as network interfaces for the IP network.

Some of this kind of gateway devices work with base stations of a mobile phone system. The mobile phone system includes a so-called a cellular phone system and, in Japan, a so-called personal handy-phone system (PHS). Hereinafter, this kind of a radio communication system is generically called a mobile communication system.

BRIEF SUMMARY OF THE INVENTION

At the present moment, there is a problem such that a bandwidth of a transmission line or network between a gateway device and the base station is not enough. If we leave the problem as it is, since this problem becomes a bottle neck to respond a communication demand which will further expand in future, any countermeasure is required. A method of resolving the problem is disclosed in Jpn. Pat. Appln. KOKAI Publication No. 2002-290480; however the method described in this patent document does not assume communication among mobile terminals and the PSTN.

An object of the present invention is to provide a communication system, a gateway device, and an adapter device which intends to expand the band width enough communication capacity between base stations and the gateway.

According to an aspect of the present invention, there is provided a communication system, comprising: a subscriber network consists of the base stations which wirelessly communicate with the mobile terminal therein; a public switched telephone network; a packet communication network; a gateway device which mutually converts communication protocols among the subscriber network, the public switched telephone network and the packet communication network to mutually connect these networks; and an Internet Protocol processing means which is installed on the subscriber network and brings an interface between the gateway device and the base station into an Internet Protocol process, wherein the gateway device comprises: a synchronized network terminating unit which terminates the public switched telephone network to generate in-device signals; a synchronized network terminating unit which terminates the packet communication network to generate the in-device signals; a subscriber network terminating unit which communicates with the base station via an interface which has been processed into the Internet Protocol and terminates the subscriber network to generate the in-device signals; and an exchange unit which exchanges in-device signals each generated from the synchronized network terminating unit, the packet network terminating unit, and the subscriber network terminating unit.

By taking such measures, the base stations and the gateway device are processed into an IP. Thereby, in comparison to house the base stations via the existing digital synchronized network (in a PHS, via an I' interface), the band may be expanded dramatically. Accordingly, communication speed and the number of channels may be increased spectacularly.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a system diagram illustrating an embodiment of a communication system regarding the present invention;

FIG. 2 is a diagram illustrating the detail of an optical storage unit 1 and a flow of data;

FIG. 4 is a functional block diagram illustrating an embodiment of a built-in adapter 50 of FIG. 1.

DETAILED DESCRIPTION OF THE INVENTION

Figure 3A:
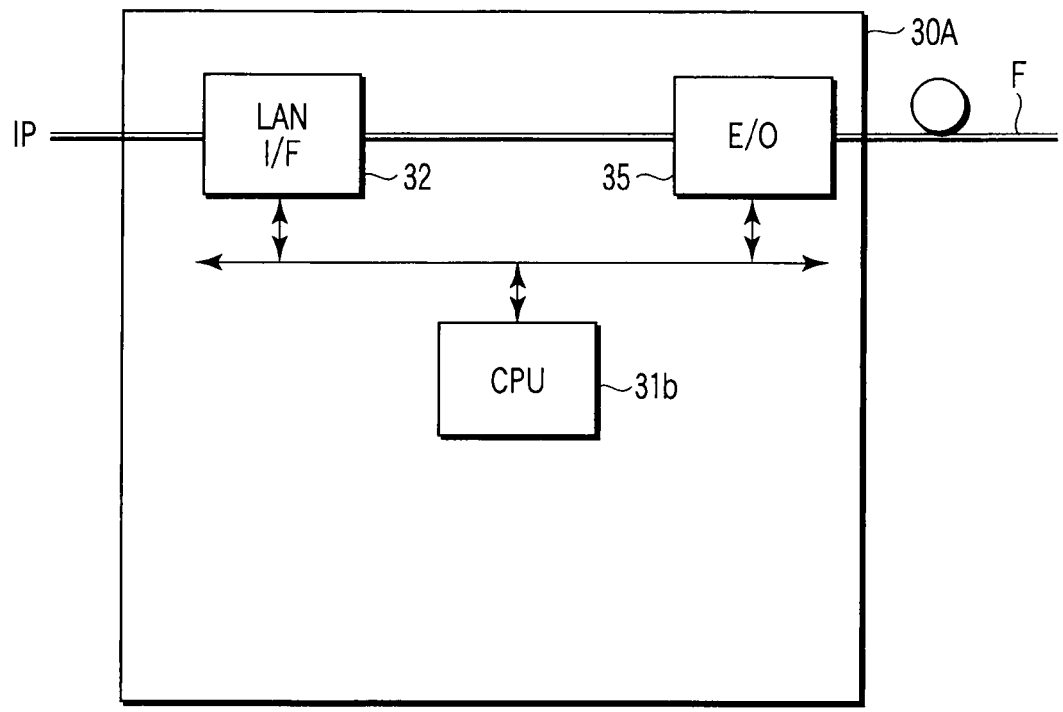
FIGS. 3A and 3B are functional block diagrams illustrating an embodiment of adapters 30A and 30B of FIG. 1.

FIG. 1 shows a system diagram depicting an embodiment of a communication system regarding the present invention. The system of FIG. 1 includes a public switched telephone network 100; an IP network 200 as a packet communication network; and a subscriber network 300. These networks are connected to a gateway 10. The network 100 is connected with the gateway 10, for example, via an I' interface. The IP network 200 is connected with the gateway 10 via an IP interface.

The gateway 10 mutually converts communication protocols among the subscriber network 300, the public switched telephone network 100 and the IP network 200 to connect these networks with one another. Inside of the gateway 10, data on each network is exchanged each other in accordance with synchronized exchange connections by using a time-division switch.

The subscriber network 300 includes a plurality of base stations 21-2n. Each base station 21-2n communicates with a mobile terminal PS such as a PHS via a wireless channel. Among the base stations, the base station 21 has a channel to be directly connected to the gateway 10 via the I' interface, and has a channel to be connected to the gateway 10 via an adapter 30A. The base station 22 is connected with the gateway 10 via an adapter 30B. The base station 2n includes a built-in adapter 50 and is connected with the gateway 10 by means of the adapter 50 via the IP interface.

Between the adapters 30A and 30B and the gateway 10, and between the base station 2n and the gateway 10 are each connected to the gateway 10 via the existing optical fiber network 400. Optical fibers F which are extended from the respective base station 21-2n are line-concentrated by a line concentration unit 500 and are connected to the gateway 10.

The optical fiber network 400 is an IP network which utilizes, for example, a passive optical network (PON) technique. A network-node interface among each base station 21-2n and the optical fiber network 400 is processed in an IP by means of functions of the bases stations themselves or the adapter 30. The base station 21 has two output interfaces. One of the two interfaces is the I' interface to be connected to the gateway 10.

The gateway 10 includes a public network interface 11 for the public switched telephone network 100, and an IP interface 12 for the IP network 200. The public network interface 11 terminates the public switched telephone network 100 to generate pulse code modulation (PCM) data that is time division data. The IP interface 12 terminates the IP network 200 to generate the PCM data.

Further, the gateway 10 is provided with an optical interfacing unit 13, a packet conversion unit 14 and a main control unit 15. The optical interfacing unit 13 houses the base stations 21-2n via the optical fibers Fs which are line-concentrated by the line concentration unit 500. That is, the optical interfacing unit 13 optically and electrically converts optical signals come from the optical fiber network 400 and also terminates the IP packets to generate the PCM data.

The main control unit 15 includes a time switch 15a in addition to a function of integrally controlling the gateway 10. The time switch 15a exchanges and connects the public switched telephone network 100, the IP network 200 and the subscriber network 300 by switching the PCM data. At this moment, the signal toward the IP network 200 is packetized into IP packets through the packet conversion unit 14. The data toward the optical fiber network 400 is packetized as IP packets by the optical interfacing unit 13.

In the inside of the gateway 10, the PCM data is transmitted via a PCM highway (PCM-HWY). The IP packets are transmitted via a local area network (LAN) or a data LAN.

The optical interfacing unit 13 includes an optical switch 13a, an optical interface 13b, a layer 2 switch for data (L2SW) 13c and a packet conversion unit 13d. The optical switch 13a switches a route of the optical fiber F from the optical fiber network 400. Thereby, the communication system may switch to operate the base stations 21-2n, and may prompt to improve fault-tolerant performance.

The optical signal introduced inside the device via an optical switch 13a is converted into an electrical signal through an opto-electric conversion element (not depicted) which is provided for the optical interface 13b. The optical interface 13b reproduces IP packets from the electrical signal. The IP packets are routed by the L2SW 13c to be transmitted to the IP interface 12 or the packet conversion unit 13d. The packet conversion unit 13d mutually converts the packets flowing through a control LAN, packets flowing through a data LAN and time division data flowing through the PCM-HWY.

FIG. 2 shows the detail of the optical interfacing unit 13 and the flow of data. The optical interfacing unit 13 has a clock processing unit 20. The clock processing unit 20 adds timing information to the PCM data to be packetized. Thereby, the system may transmit the PCM data and the synchronizing timing data in the same channel, and may respond to the base stations having only the digital synchronizing interfaces.

In the optical housing unit 13 of FIG. 2, the transmission data including voice or binary codes traces the route of the optical interface 13b, the L2SW 13c, the packet conversion unit 14, the main control unit 15, in that order to be transmitted. The transmitted data is exchanged by the time switch 15a of the main control unit 15, packetized again by the packet conversion unit 14 and transmitted to the IP interface via the IP interface 12.

Since the base station 21 has both the IP interface and the digital synchronizing interface, the base station 21 may transmit synchronized information through the digital synchronized network. In this case, the system may transmits the transmitted data as it is in the packets to the IP network from the IP interface of the base station via the IP interface 12 passing through the optical interface 13b and the L2SW 13c for data, in that order. As an example of the digital synchronized network, the Integrated Services Digital Network (ISDN) widely used in Japan is a possible approach.

Figure 3B:
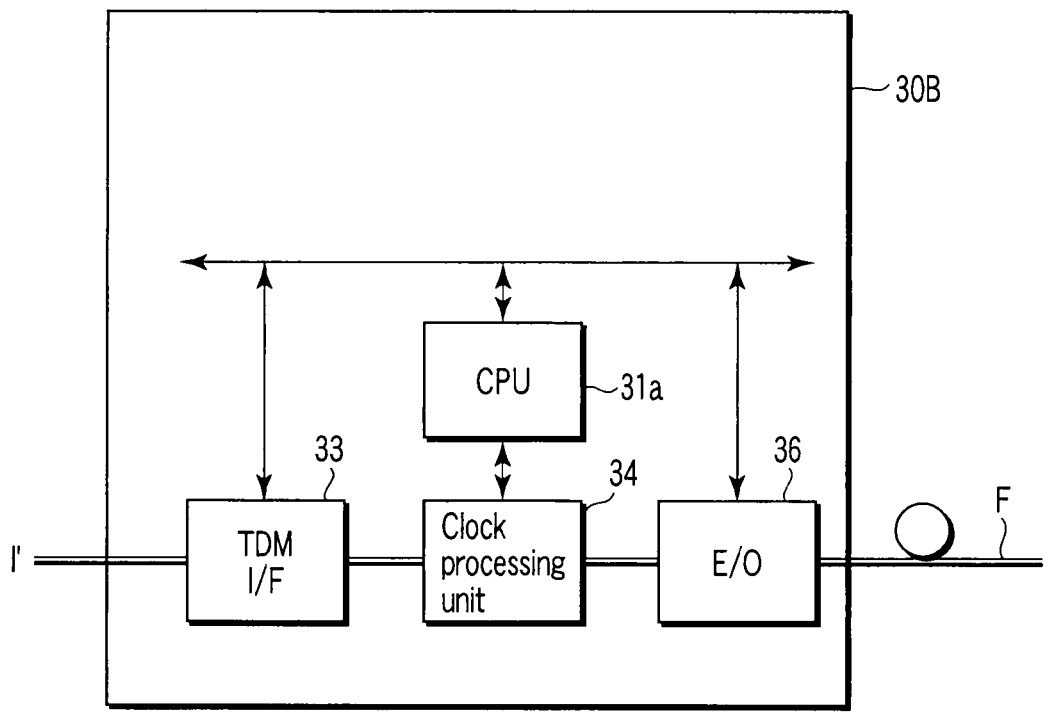

FIGS. 3A and 3B show functional block diagrams depicting an embodiment of the adapters 30A and 30B in FIG. 1. In the adapter 30A, the IP packets transmitted from the base station 21 are optimized as they are in packet forms by the electro-optic conversion unit 35 via the LAN interface 32 and transmitted to the optical fibers F. In the adapter 30B, the time division data from the base station 22 is packetized by time division multiplexing (TDM) interface 33. The packets are optimized by the electro-optic conversion unit 36 through the clock processing unit 34 to be transmitted to the optical fiber F. The packets from the optical fiber F are applied clock transmission processing in an upper layer to be transmitted to the I' interface. Such processing is integrally performed by a central processing unit (CPU) 31 or a CPU 32.

FIG. 4 shows a functional block diagram depicting an embodiment of the built-in adapter 50 in FIG. 1. Including this built-in adapter 50 enables the base station 2n to handle both the packets and TDM signals. The packets among them are optimized by an electro-optic conversion unit 55 via a signal processing unit 54 from a LAN switch 52 to be transmitted to the optical fibers F. After being added clock information from the clock processing unit 53, the TDM signals are optimized by an electro-optic conversion unit 55 through the signal processing unit 54 to be transmitted to the optical fibers Fs. Such processing is integrally controlled by the CPU 51.

According to the foregoing configuration, either interface of the base station and of the gateway 10 is processed into an IP. In other words, the adapter 30 packetizes the TDM signal from the base station into IP packets. Also in the gateway 10, the PCM data applied line exchange is packetized into IP packets at the optical interfacing unit 13. Thereby, since the subscriber network 300 is processed into an IP network, the system may expand the transmission band which is larger than the conventional subscriber network that has been a time division network. Further, in this embodiment, the subscriber network 300 is optimized, and an optical transmission network in which PON techniques are combined with the optical fiber network 400 is formed. Thereby, channel speed of the subscriber network 300 may ensure up to upper limit speed of the PON (100 Mbps or 1.25 Gbps).

Moreover, installing the built-in adapter 50 in the base station enables simplifying the configuration of the adapter itself and also enables directly connecting the optical fibers Fs to the base stations 21-2n, and enables obtaining merit such as a reduction in lightning damage.

In short, in this embodiment, the system installs the adapters 30, 50 on the subscriber network 300 and converts the I' interface from the base stations 21-2n into the IP interface, and optimizes a physical layer interface. The system also installs the optical interfacing unit 13 in the gateway 10 to house the optical fibers Fs from the adapters 30 and 50, and converts the IP packets into the PCM data to process the IP packets in the device. Accordingly, the system may also convert and connect the transmitted data from the subscriber network 300 inside the gateway 10. Therefore, the public switched telephone network 100, the IP network 200 and the subscriber network 300 may be connected to one another. Thus, the communication system, the gateway device and the adapter device, which intend to improve the communication speed by expanding the band capable of being housed, may be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system, comprising:
    a subscriber network having a base station configured to wirelessly communicate with mobile terminals;
    a synchronized network;
    a packet communication network;
    an adapter device which is installed on the subscriber network; and
    a gateway device which is connected to the base station via the adapter device and a I' interface;
    wherein the adapter comprises:
    an Internet Protocol processor configured to bring the I' interface from the base station into an Internet Protocol to connect the I' interface to the gateway device;
    an optical activation unit configured to connect the base station and the gateway device with each other via an optical fiber and optically activate the I' interface which is brought into the Internet Protocol; and
    a clock processing unit configured to apply clock transmission processing to packets from the I' interface which is brought into the Internet Protocol in an upper layer to transmit the packets to the I' interface from the base station;
    the gateway device comprises:
    a protocol converter configured to mutually convert communication protocols among the subscriber network, the synchronized network and the packet communication network to mutually connect these networks;
    a synchronized network terminating interface configured to terminate the synchronized network to generate in-device signals;
    a packet communication network terminating interface configured to terminate the packet communication network to generate the in-device signals;
    a subscriber network terminating interface configured to terminate the I' interface which is optically activated to generate the in-device signals; and
    an exchange unit configured to exchange in-device signals each generated from the synchronized network terminating interface, the packet communication network terminating interface, and the subscriber network terminating interface.

2. The communication system according to claim 1, wherein the optical activation unit comprises:
    an electro-optic conversion unit which is disposed on the subscriber network, electro-optically converts a signal transmitted from the mobile terminals and received by the base station and transmits the signal to the optical fiber; and
    an opto-electric conversion unit which is installed in the gateway device and opto-electrically converts an optical signal incoming via the optical fiber.

3. The communication system according to claim 2, wherein the optical activation unit is installed in the base station.

4. The communication system according to claim 1, wherein the subscriber network comprises:
    a plurality of base stations; and
    an optical line concentration unit configured to inline-collect optical fibers each extended from the plurality of base stations to connect the fibers to the gateway device.

5. The communication system according to claim 4, wherein the gateway device includes an optical switching unit which switches to operate the plurality of base stations.

6. A gateway device that connects to a base station via an adapter and a I' interface, comprising:
    a protocol converter configured to mutually convert communication protocols among a subscriber network, a synchronized network and a packet communication network to mutually connect these networks;
    a synchronized network terminating interface configured to terminate the synchronized network to generate in-device signals;
    a packet communication network terminating interface configured to terminate the packet communication network to generate the in-device signals;
    a subscriber network terminating interface configured to terminate the I' interface which is optically activated to generate the in-device signals; and
    an exchange unit configured to exchange in-device signals each generated from the synchronized network terminating interface, the packet communication network terminating interface, and the subscriber network terminating interface.

7. The gateway device according to claim 6, wherein the subscriber network includes a plurality of base stations and an optical concentration unit configured to inline-collect optical fibers each extending from the plurality of base stations to connect the fibers to the gateway device, and
    the gateway device includes an optical switching unit which switches to operate the plurality of base stations.

8. An adapter device that connects a gateway device to a base station and an I' interface, comprising:

an Internet Protocol processor configured to bring the I' interface from the base station into an Internet Protocol to connect the I' interface to the gateway device;

an optical activation unit configured to connect the base station and the gateway device with each other via an optical fiber and optically activate the I' interface which is brought into the Internet Protocol, the optical activation unit including an electro-optic conversion unit which is disposed on a subscriber network and electro-optically converts a signal transmitted from mobile terminals and received by the base station and transmits the signal to the optical fiber, and an opto-electric conversion unit which is installed in the gateway device and opto-electrically converts an optical signal incoming via the optical fiber; and a clock processing unit configured to apply clock transmission processing to packets from the I' interface which is brought into the Internet Protocol in an upper layer to transmit the packets to the I' interface from the base station.

9. The adapter device according to claim 8, wherein the optical activation unit is installed in the base station.

* * * * *